(12) United States Patent
Chun et al.

(10) Patent No.: US 9,328,235 B2
(45) Date of Patent: May 3, 2016

(54) ASPHALT MODIFIER COMPOSITION AND ASPHALT COMPOSITION COMPRISING THE SAME

(75) Inventors: Moon Seok Chun, Daejeon (KR); Jin Young Ryu, Daejeon (KR); Ik Jun Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 162 days.

(21) Appl. No.: 12/936,502

(22) PCT Filed: May 20, 2009

(86) PCT No.: PCT/KR2009/002647
§ 371 (c)(1),
(2), (4) Date: Oct. 5, 2010

(87) PCT Pub. No.: WO2010/011022
PCT Pub. Date: Jan. 28, 2010

(65) Prior Publication Data
US 2011/0034595 A1    Feb. 10, 2011

(30) Foreign Application Priority Data

Jul. 21, 2008 (KR) .................. 10-2008-0070598

(51) Int. Cl.
*C08K 5/11* (2006.01)
*C08L 53/02* (2006.01)
*C08L 95/00* (2006.01)

(52) U.S. Cl.
CPC . *C08L 53/02* (2013.01); *C08K 5/11* (2013.01); *C08L 95/00* (2013.01)

(58) Field of Classification Search
CPC .................................. C08L 95/00; C08K 5/11
USPC .......................................... 524/71, 315, 317
See application file for complete search history.

(56) References Cited

U.S. PATENT DOCUMENTS

| 4,304,886 | A  | * | 12/1981 | Bean et al. ............... 525/314 |
| 5,482,737 | A  | * | 1/1996  | Gaveske .................. 427/140 |
| 2003/0070579 | A1 | * | 4/2003 | Hong et al. ............. 106/31.04 |
| 2005/0004273 | A1 |   | 1/2005 | Chun et al. |
| 2005/0154114 | A1 | * | 7/2005 | Hale ...................... 524/436 |
| 2006/0089432 | A1 |   | 4/2006 | Kawakami et al. |
| 2006/0229391 | A1 |   | 10/2006 | Torii et al. |
| 2007/0105986 | A1 |   | 5/2007 | Kluttz et al. |
| 2008/0146477 | A1 | * | 6/2008 | Mentink et al. .......... 510/109 |
| 2009/0105376 | A1 |   | 4/2009 | Korenstra et al. |

FOREIGN PATENT DOCUMENTS

| CN | 1135226 A | 11/1996 |
| CN | 1421471 A | 6/2003 |
| CN | 1537894 A | 10/2004 |
| CN | 1620481 A | 5/2005 |
| EA | 008191 B1 | 7/2003 |
| JP | 8-165435 A | 6/1996 |
| JP | 10-017777 * | 1/1998 |
| JP | 10-17777 A | 1/1998 |
| JP | 10-017777 A | 1/1998 |
| JP | 1998-017777 | 1/1998 |
| JP | 2002-030126 A | 1/2002 |
| KR | 10-0332632 B1 | 4/2002 |
| KR | 10-2002-0078688 A | 10/2002 |
| KR | 10-2004-0025056 A | 3/2004 |
| WO | 9514049 A1 | 5/1995 |
| WO | WO 2004/007581 A1 | 1/2004 |
| WO | WO 2005/123834 A1 | 12/2005 |

* cited by examiner

*Primary Examiner* — Peter D Mulcahy
(74) *Attorney, Agent, or Firm* — Dentons US LLP

(57) ABSTRACT

Disclosed are block copolymer formed by block-copolymerizing vinyl aromatic hydrocarbon and conjugated diene compound and asphalt modifier composition including specific functional additives. Asphalt modifier composition according to the present invention is rapidly dissolved in asphalt without substantially lowering a softening point of asphalt, making it possible to form uniform asphalt composition and improve the productivity of the asphalt composition.

12 Claims, No Drawings

ASPHALT MODIFIER COMPOSITION AND ASPHALT COMPOSITION COMPRISING THE SAME

THE CROSS-REFERENCE TO RELATED APPLICATIONS (INCORPORATION BY REFERENCE)

The present application is a national phase entry under 35 U.S.C. 371 of International Application No. PCT/KR2009/002647, filed 20 May 2009, which claims the benefit of Korean Patent Application No. 10-2008-0070598, filed on 21 Jul. 2008. The disclosures of said applications are incorporated by reference herein.

TECHNICAL FIELD

The present invention relates to asphalt modifier composition and asphalt composition comprising the same, and more specifically, to asphalt modifier composition having an improved dissolution rate for asphalt and asphalt composition comprising the same.

BACKGROUND ARTS

The use range of asphalt used as a material for road pavement and waterproofing has been considerably restricted due to cracking at low temperature, plastic deformation at high temperature, etc. Therefore, studies and applications on various asphalt modifiers have been actively progressed in order to improve the disadvantage of asphalt.

As the asphalt modifier, various polymer materials, such as olefin/acrylic copolymer, vinyl aromatic hydrocarbon/conjugated diene random copolymer, vinyl aromatic hydrogen/conjugated diene block copolymer, etc., can be used. Among others, the vinyl aromatic hydrogen/conjugated diene block copolymer has been the most widely used since it can remarkably increase the use temperature range and lifetime of asphalt.

Meanwhile, in the asphalt modifying process, it is very important to dissolve and disperse the polymer materials in asphalt. Generally, the solution rate of asphalt modifier is slow, thereby having a direct effect on productivity. In order to improve productivity, the solubility of asphalt can be increased by controlling the molecular weight and molecular structure of the polymer material, which deteriorates the final mechanical physical properties.

DISCLOSURE OF INVENTION

The present invention proposes to solve the problem in the related art.

Therefore, it is an object of the present invention to provide asphalt modifier composition improving a fact that block copolymer, which is asphalt modifier (vinyl aromatic hydrocarbon/conjugated diene compound) added to increase the use temperature range and lifetime of asphalt, is slowly dissolved in asphalt, that is, the solution rate of block copolymer for asphalt and asphalt composition containing the same.

Further, it is an object of the present invention to provide a method for preparing asphalt modifier composition.

Asphalt modifier composition according to the present invention includes block copolymer, which is formed by block-copolymerizing vinyl aromatic hydrocarbon and conjugated diene compound, and functional additive selected from a group consisting of compounds represented by Formulae 1 and 2.

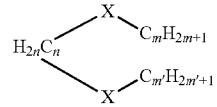

[Formula 1]

In Formula 1, n+m+m' is up to 35, preferably up to 25. Each of n, m and m' is an integer of at least 1. X is an ester group[-C(=O)O—], a carbonyl group[-C(=O)—], an ether group[-O—], a thio group[-S—], an amine group[-N(H)—], an alkylamine group[-N(R)—], or a phosphine group[-P(H)—].

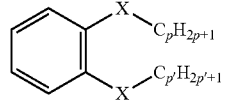

[Formula 2]

In Formula 2, p+p' is up to 30, more preferably, up to 20. Each of p and p' is an integer of at least 1. X is an ester group[-C(=O)O—], a carbonyl group[-C(=O)—], an ether group[-O—], a thio group[-S—], an amine group[-N(H)—], an alkylamine group[-N(R)—], or a phosphine group[-P(H)—].

In the asphalt modifier composition of the present invention, it is preferable that the block copolymer is included in amount of 90 to 99.9 wt % and the functional additive is included in amount of 0.1 to 10 wt %. Specifically, the functional additive may be selected from a group consisting of adipate compound and phthalate compound and more specifically, the functional additive may be selected from a group consisting of di(2-ethylhexyl)adipate, di(2-ethylhexyl)phthalate, and diisodecyl phthalate.

The present invention also provides asphalt modifier composition and asphalt composition containing asphalt.

The present invention also provides a method for preparing asphalt modifier composition. A method for preparing asphalt modifier composition according to the present invention comprises: preparing block copolymer by block-copolymerizing vinyl aromatic hydrocarbon and conjugated diene compound by anionic polymerization using organic anionic initiator in a reactor containing a hydrocarbon solvent; injecting functional additive selected from a group consisting of compounds represented by Formulae 1 and 2 in the reactor; and obtaining asphalt modifier composition including the block copolymer and the functional additive by removing the hydrocarbon solvent.

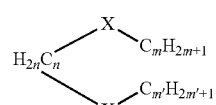

[Formula 1]

In Formula 1, n+m+m' is up to 35, preferably up to 25. Each of n, m and m' is an integer of at least 1. X is an ester group[-C(=O)O—], a carbonyl group[-C(=O)—], an ether group[-O—], a thio group[-S—], an amine group[-N(H)—], an alkylamine group[-N(R)—], a phosphine group[-P(H)—].

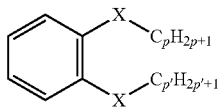

[Formula 2]

In Formula 2, p+p' is up to 30, preferably up to 20. Each of p and p' is an integer of at least 1. X is an ester group[-C(=O)O—], a carbonyl group[-C(=O)—], an ether group[-O—], a thio group[-S—], an amine group[-N(H)—], an alkylamine group[-N(R)—], or a phosphine group[-P(H)—].

In the above description, the preparation of the block copolymer may include: forming vinyl aromatic block by adding the vinyl aromatic hydrocarbon in the reactor including the hydrocarbon solvent and then injecting the organic anionic initiator therein; forming conjugated diene block connected to a terminal of the conjugated diene block by adding the conjugated diene compound in the reactor; and forming the vinyl aromatic block connected to the terminal of the conjugated diene block formed by adding the vinyl aromatic hydrocarbon in the reactor or forming linear triblock copolymer by injecting coupling agent in the reactor.

In addition, the preparation of the block copolymer includes: forming the vinyl aromatic block by adding the vinyl aromatic hydrocarbon in the reactor including the hydrocarbon solvent and then injecting the organic anionic initiator therein; forming the conjugated diene block connected to the terminal of the vinyl aromatic block by adding the conjugated diene compound in the reactor; and forming radial triblock copolymer by injecting the coupling agent in the reactor.

Hereinafter, the present invention will be described in more detail.

Asphalt modifier composition according to the present invention includes block copolymer, which is formed by block-copolymerizing vinyl aromatic hydrocarbon and conjugated diene compound, and functional additive selected from a group consisting of compounds represented by Formulae 1 and 2.

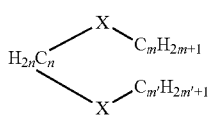

[Formula 1]

In Formula 1, n+m+m' is up to 35, preferably up to 25. Each of n, m and m' is an integer of at least 1. X is an ester group[-C(=O)O—], a carbonyl group[-C(=O)—], an ether group[-O—], a thio group[-S—], an amine group[-N(H)—], an alkylamine group[-N(R)—], or a phosphine group[-P(H)—].

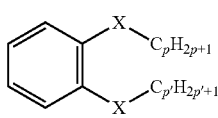

[Formula 2]

In Formula 2, p+p' is up to 30, preferably up to 20. Each of p and p' is an integer of at least 1. X is an ester group[-C(=O)O—], a carbonyl group[-C(=O)—], an ether group[-O—], a thio group[-S—], an amine group[-N(H)—], an alkylamine group[-N(R)—], or a phosphine group[-P(H)—].

The functional additive used in the present invention is added to improve a disadvantage of the block copolymer including the vinyl aromatic block and the conjugated diene block that has been used as the asphalt modifier in the related art, that is, the slow solution rate for asphalt. The functional additive has an advantage in that the block copolymer is rapidly dissolved in asphalt and the softening point of asphalt does not significantly lower.

Factors affecting the solution rate of the vinyl aromatic hydrocarbon/conjugated diene copolymer for asphalt may include temperature, shearing rate, particle size and distribution, molecular structure of polymer, etc. Among others, the present invention uses the functional additive having solubility parameter similar to the vinyl aromatic hydrocarbon/conjugated diene copolymer to improve the solution rate by weakening the molecular structure of copolymer, in particular, styrene block.

If the functional additive is the compounds represented by Formulae 1 and 2, it is not particularly limited. Specifically, the functional additive may be selected from a group consisting of adipate compound and phthalate compound and more specifically, the functional additive may be selected from a group consisting of di(2-ethylhexyl)adipate, di(2-ethylhexyl) phthalate, and diisodecyl phthalate.

Meanwhile, the block copolymer used in the present invention is asphalt modifier that has been used for increasing the use temperature range and lifetime of asphalt from the related art. As the modifier suitable for the present invention among these modifiers, the block copolymer includes vinyl aromatic block having molecular weight of 5,000 to 150,000 g/mol and conjugated diene block having molecular weight of 8,000 to 150,000 g/mol and the weight ratio of the vinyl aromatic block to the conjugated diene block is preferably in the range of 5:95 to 50:50.

The vinyl aromatic block of the block copolymer is preferably formed by one or more compounds selected from a group consisting of styrene, methylstyrene, and a mixture thereof and the conjugated diene block of the block copolymer is preferably formed by one or more compound selected from a group consisting of butadiene, isoprene, and a mixture thereof.

The block copolymer is preferably triblock copolymer where the conjugated diene block is formed between the vinyl aromatic blocks. As an example of the triblock copolymer, the triblock copolymer may be a form that the vinyl aromatic block, the conjugated diene block, and the vinyl aromatic block are linearly connected in order and the triblock copolymer may be a star shape or a radial shape that is formed by coupling agent such as Si (-conjugated diene block, -vinyl aromatic block)$_4$. The molecular weight of the triblock copolymer is preferably in the range of 15,000 to 500,000.

In the asphalt modifier composition of the present invention, the block copolymer is preferably included in amount of 90 to 99.9 wt/% and the functional additive is preferably included in amount of 0.1 to 10 wt %. If a too large amount of functional additive is included, the physical properties of basic composition can be degraded and if a too small large of functional additive is included, it is difficult to obtain the desired function.

The present invention provides a method for preparing asphalt modifier composition. A method for preparing asphalt modifier composition according to the present invention comprises: preparing block copolymer by block-copolymerizing vinyl aromatic hydrocarbon and conjugated diene compound by anionic polymerization using organic anionic initiator in a reactor containing a hydrocarbon solvent; injecting functional additive selected from a group consisting of compounds represented by Formulae 1 and 2 in the reactor; obtaining asphalt modifier composition including the block copolymer and the functional additive by removing the hydrocarbon solvent.

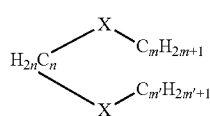

[Formula 1]

In Formula 1, n+m+m' is up to 35, preferably up to 25. Each of n, m and m' is an integer of at least 1. X is an ester group[-C(=O)O—], a carbonyl group[-C(=O)—], an ether group[-O—], a thio group[-S—], an amine group[-N(H)—], an alkylamine group[-N(R)—], or a phosphine group[-P(H)—].

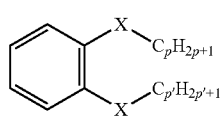

[Formula 2]

In Formula 2, p+p' is up to 30, preferably up to 20. Each of p and p' is an integer of at least 1. X is an ester group[-C(=O)O—], a carbonyl group[-C(=O)—], an ether group[-O—], a thio group[-S—], an amine group[-N(H)—], an alkylamine group[-N(R)—], or a phosphine group[-P(H)—].

In the above description, the preparation of the block copolymer includes: forming vinyl aromatic block by adding first vinyl aromatic hydrocarbon in the reactor including the hydrocarbon solvent and then injecting the organic anionic initiator therein; forming conjugated diene block connected to a terminal of the conjugated diene block by adding the conjugated diene compound in the reactor; and forming the vinyl aromatic block connected to the terminal of the conjugated diene block formed by adding second vinyl aromatic hydrocarbon in the reactor, thereby forming a linear SBS block copolymer. Also, an appropriate coupling agent may be added instead of adding the second vinyl aromatic hydrocarbon so as to form linear triblock copolymer. In addition, the preparation of the block copolymer may include: forming the vinyl aromatic block by adding the vinyl aromatic hydrocarbon in the reactor including the hydrocarbon solvent and then injecting the organic anionic initiator therein; forming the conjugated diene block connected to the terminal of the vinyl aromatic block by adding the conjugated diene compound in the reactor; and forming a star-shaped or radial triblock copolymer block, such as Si (conjugated diene, vinyl aromatic block)$_4$, etc., by injecting the coupling agent, such as Silicon Tetra Chloride, etc. in the reactor.

The anionic polymerization used in the present invention performs the block polymerization in a manner that the styrene block is sequentially formed starting from n-butyl negative ions and the negative ions are formed at a terminal of the styrene block by injecting the vinyl aromatic compound, such as styrene, in the hydrocarbon solvent containing the organic anionic initiator, such as n-butyl, lithium, etc., for example, n-hexane, heptane, etc. In such a manner, if the styrene compound is completely consumed, the conjugated diene compound, such as butadiene, is injected to form the butadiene block from the terminal of the styrene block. At this time, the negative ions are formed at the terminal of the butadiene block. If the butadiene compound is completely consumed, the styrene compound is injected, making it possible to form the SBS block copolymer. In the anionic copolymerization, the negative ions are always formed at the terminal of the block, such that the block can be extended. Finally, when the extension of the block intends to end, the negative ions existing at the terminal of the block should be removed by injecting compounds, such as water, alcohol, etc.

The organic anionic initiator and the hydrocarbon solvent can be generally used for the anionic polymerization and can be used without any limitation. These materials are generally known in the art to which the present invention belongs.

As such, the present invention prepares the polymer material that can be used as the asphalt modifier and then injects and mixes the functional additive. Thereafter, the present invention retrieves solvent and then obtains a uniform pellet of the asphalt modifier composition. Then, the present invention uses the pellet as modifier when performing the asphalt mixing, making it possible to obtain the modified asphalt having excellent physical properties.

The asphalt modifier composition of the present invention prepared by the method is used by being finally mixed with asphalt. In the asphalt composition, the mixing ratio of the asphalt modifier composition and the asphalt is preferably 1:99 to 15:85 based on weight. When mixing the asphalt modifier composition with asphalt, the temperature of asphalt is generally 150 to 240. When the temperature of asphalt is too low, mixing is hard and when the temperature is too high, much cost is consumed as well as compounds may be modified.

Mixing the block copolymer containing the functional additive with asphalt can be performed as follows by using a low shear agitator having a simple agitating function or a high shear agitator having a grinding and agitating function.

500 g asphalt puts in a mixing vessel and is maintained for five minutes at a temperature of 150 and an agitation speed of 400 rpm of an agitator. Next, the agitation speed of the agitator is increased to 1000 rpm and the quantitative block copolymer (including functional additive) is then added. Thereafter, the temperature is increased to 180 for three minutes and the agitation speed is increased to 300 rpm. The dispersion state and size of the copolymer particle are observed through a fluorescent microscope while dissolving the block copolymer in asphalt by the agitation for a predetermined time. A point where the size of the block copolymer particle dispersed in asphalt arrives at 1 µm or less is considered as a completely dissolved time point. The softening point at that time is measured.

The asphalt uses AP-5 asphalt having softening point of 40 to 60, penetration degree of 60 to 70, and low temperature elongation of 5 or less. The softening point of the mixture of asphalt/block copolymer is measured by an ASTM36 method. The mixing ratio of the asphalt/block copolymer mixture can be controlled in the range of 0.1:99.9 to 20:80, preferably 1:99 to 15:85.

BEST MODES FOR CARRYING OUT THE INVENTION

Hereinafter, the present invention will be described in more detail with reference to the embodiments. However, the following embodiment is only an implementation example of the present invention and therefore, should not be construed as limiting the scope of the present invention.

Example 1

The block copolymer was prepared as follows using styrene and butadiene as monomer. Cyclohexan of 4590 g, which is a solvent, and styrene of 264 g are injected in a reactor of 10 L filled with nitrogen and n-butyl lithium of 0.672 g is added at a temperature of 60° C., thereby polymerizing styrene. Styrene is polymerized and butadiene of 587 g, which is a monomer, is then injected, thereby generating a butadiene block at a terminal of the polymerized styrene block. Butadiene polymerization completes and silicon tetra chloride of 0.388 g is then injected, thereby performing the coupling reaction. Thereafter, the polymerization reaction completes by injecting water of 0.5 g. IR1076 (Irganox 1076) of 3.5 g and TNPP of 7.5 g, which are antioxidants, are added in the polymerization solution as additives, di (2-ethylhexyl) adipate of 42 g, which is a functional additive, is finally added and dispersed, and the solvent is then retrieved, thereby preparing the block copolymer. The molecular weight of the triblock copolymer prepared as above was 320,000 g/mol. The prepared block copolymer of 18 g is mixed with asphalt of 500 g at a temperature of 180° C. and an agitation speed of 3000 rpm. A point where the size of the block copolymer particle dispersed in asphalt arrives at 1 .mu.m or less is considered as a completely dissolved time point. The time point is recorded as the dissolution time. The softening point at that time is measured. The dissolution time and the softening point are represented by the following table.

Example 2

Except using the di(2-ethylhexyl) adipate of 26 g as the functional additive, Example 2 is performed in the same method as Example 1. The softening point is measured and the results are represented by the following table.

Comparative Example 1

Except using the di(2-ethylhexyl) phthalate of 42 g as the functional additive, Comparative Example 1 is performed in the same method as Example 1. The softening point is measured and the results are represented by the following table.

Comparative Example 2

Except using the diisodecyl phthalate of 42 g as the functional additive, Comparative Example 2 is performed in the same method as Example 1. The softening point is measured and the results are represented by the following table.

Comparative Example 3

Except that the functional additive is not injected, Comparative Example 3 is performed in the same manner as Example 1. The softening point is measured and the results are represented by the following table

TABLE 1

Dissolution time of block copolymer and softening point of asphalt mixture

| | Example 1 | Example 2 | Comparative Example 1 | Comparative Example 2 | Comparative Example 3 |
|---|---|---|---|---|---|
| dissolution time (hr) | 2.0 | 2.3 | 2.8 | 3.0 | 3.5 |
| softening point (° C.) | 59.0 | 59.4 | 59.0 | 59.6 | 60.1 |

As can be appreciated from Table 1, the examples of the present invention significantly reduces the dissolution time of the modifier in asphalt without significantly lowering the softening point of asphalt, as compared to the asphalt modifier in the related art that does not include the functional additives.

The asphalt modifier composition according to the present invention is rapidly dissolved in asphalt without substantially lowering the softening point of asphalt, making it possible to form the uniform asphalt composition and improve the productivity of the asphalt composition.

What is claimed is:

1. An asphalt modifier composition, comprising:
    a block copolymer, which is formed by block-copolymerizing a vinyl aromatic hydrocarbon and a conjugated diene compound; and
    di(2-ethylhexyl)adipate as a functional additive,
    wherein the block copolymer is an amount of 90 to 99.9 wt % and the function additive is an amount of 0.1 to 10 wt %, and
    wherein the weight ratio of the vinyl aromatic block to the conjugated diene block is in the range of 5:95 to 50:50.

2. The asphalt modifier composition according to claim 1, wherein the block copolymer includes the vinyl aromatic block having molecular weight of 5,000 to 150,000 g/mol and the conjugated diene block having molecular weight of 8,000 to 150,000 g/mol.

3. The asphalt modifier composition according to claim 1, wherein the vinyl aromatic block of the block copolymer is formed by one or more compound selected from a group consisting of styrene, methylstyrene, and a mixture thereof, and the conjugated diene block of the block copolymer is formed by one or more compound selected from a group consisting of butadiene, isoprene, and a mixture thereof.

4. The asphalt modifier composition according to claim 1, wherein the block copolymer is triblock copolymer in which the conjugated diene block is formed between the vinyl aromatic blocks.

5. The asphalt modifier composition according to claim 4, wherein the triblock copolymer has a linear form that the vinyl aromatic block, the conjugated diene block, and the vinyl aromatic block are connected in order.

6. The asphalt modifier composition according to claim 4, wherein the triblock copolymer is a star shape of Si (-conjugated diene block, -vinyl aromatic block)$_4$.

7. The asphalt modifier composition according to claim 4, wherein the molecular weight of the triblock copolymer is in the range of 15,000 to 500,000 g/mol.

8. An asphalt composition comprising the asphalt modifier composition according to claim 1 and asphalt.

9. The asphalt modifier composition according to claim 8, wherein the mixing ratio of the asphalt modifier composition and the asphalt is 1:99 to 15:85 based on weight.

10. A method for preparing an asphalt modifier composition, comprising:

preparing a block copolymer by block-copolymerizing a vinyl aromatic hydrocarbon and a conjugated diene compound by anionic polymerization using organic anionic initiator in a reactor containing a hydrocarbon solvent;

injecting di(2-ethylhexyl) adipate as a functional additive into the reactor; and obtaining the asphalt modifier composition including 90 to 99.9 wt % of the block copolymer and 0.1 to 10 wt % of the functional additive by removing the hydrocarbon solvent.

11. The method for preparing the asphalt modifier composition according to claim 10, wherein the step of preparing the block copolymer comprises:

forming the vinyl aromatic block by adding the vinyl aromatic hydrocarbon in the reactor including the hydrocarbon solvent and followed by injecting the organic anionic initiator therein;

forming the conjugated diene block connected to a terminal of the vinyl aromatic block by adding the conjugated diene compound in the reactor; and forming the vinyl aromatic block connected to the terminal of the conjugated diene block formed by adding the vinyl aromatic hydrocarbon in the reactor or forming linear triblock copolymer by injecting coupling agent in the reactor.

12. The method for preparing the asphalt modifier composition according to claim 10, wherein the step of preparing the block copolymer comprises:

forming the vinyl aromatic block by adding the vinyl aromatic hydrocarbon in the reactor including the hydrocarbon solvent and followed by injecting the organic anionic initiator therein;

forming the conjugated diene block connected to a terminal of the vinyl aromatic block by adding the conjugated diene compound in the reactor; and forming a star-shaped triblock copolymer by injecting a coupling agent in the reactor.

* * * * *